United States Patent [19]

Carney

[11] 4,004,192

[45] Jan. 18, 1977

[54] PROTECTOR MODULE FOR TELEPHONE SYSTEMS

[76] Inventor: William V. Carney, Valley Stream, N.Y.

[22] Filed: Aug. 28, 1975

[21] Appl. No.: 608,508

[52] U.S. Cl. .................................... 317/16; 317/61; 337/32

[51] Int. Cl.² .......................................... H02H 3/22

[58] Field of Search ................. 337/29, 32; 317/61, 317/62, 16

[56] References Cited

UNITED STATES PATENTS

| | | | |
|---|---|---|---|
| 3,573,695 | 4/1971 | Geyer et al. | 337/32 |
| 3,849,750 | 11/1974 | Baumbach et al. | 337/32 |
| 3,947,730 | 3/1976 | De Luca et al. | 317/62 |

*Primary Examiner*—Harry Moose

[57] ABSTRACT

An improved telephone line protection device including means for grounding excessive currents and voltages. The disclosed embodiment includes temperature-actuated resilient means for shorting excessive currents directly to a source of ground potential, without passing such currents through the elements normally present for protecting against excessive voltage surges, which are damaged by carrying excessive currents.

2 Claims, 3 Drawing Figures

PROTECTOR MODULE FOR TELEPHONE SYSTEMS

RELATED APPLICATION

Reference is made to my co-pending application Ser. No. 584,768 filed June 9, 1975, and assigned to the same assignee as the present application, which discloses and claims a closely related invention.

BACKGROUND OF THE INVENTION

This invention relates generally to the field of telephone protection modules associated with individual telephone subscriber lines, for the joint purpose of shielding such lines from damage caused by the presence of excessive voltage or excessive currents which may result from contact with fallen power lines, incorrect connections with non-telephone circuits, and the like.

Depending upon the particular requirements of individual telephone systems, protector modules will normally include a pair of carbon blocks defining a gap over which excessive voltages may arc in the process of being conducted to a source of ground potential. The carbon blocks are often combined with heat-senstive means responsive to the presence of excessive currents to permit a resilient means to short said currents through the carbon blocks to ground potential. Other types include a more recently developed gaseous discharge device, the outer surfaces of which are employed to conduct the currents to ground potential.

While such constructions offer protection to the particular subscriber line with which they are associated, the above described mode of operation often results in unnecessary damage to the module or the components thereof, whereby repair of the same for reuse is no longer practical. Where excessive currents are allowed to arc through the carbon blocks or gaseous discharge device, the heat developed by such currents, often in the order of 100 amperes or more results in a welding action destroying both the casing of the module and the internal components thereof. Prior art devices have, in the past, been considered expendable, but the cost of manufacture of more recent sophisticated designs is no longer inconsequential.

SUMMARY OF THE INVENTION

Briefly stated, the invention contemplates the provision of improved protector modules of the above described type in which means is incorporated for the conduction of excess currents to ground potential by by-passing the components provided for the protection against excessive voltages, so that arcing of excessive currents carrying heat of destructive proportions is avoided. Depending upon the elements present in the module, e.g. carbon blocks only, gaseous discharge tube, or carbon blocks in conjunction with heat-sensitive devices, the establishment of direct connection to ground potential upon the occurrence of excessive currents is accomplished.

The invention further contemplates the establishment of supplemental conductive paths in such constructions, whereby the effective resistance to excessive current flow is reduced by at least an order of magnitude, and arcing is prevented in parts of the module other than the excessive voltage protective elements.

In the above mentioned co-pending application, the disclosed embodiments provide means whereby the path of excess current by-passes the carbon blocks or gaseous discharge device. However, the reliability of the current path is somewhat dependent upon the resiliency of the conductive elements which come into communication upon the activation of the heatresponsive elements when in actuated condition, thereby tending to provide a point of possible failure.

It is an object of the present invention to provide a device as described in the above mentioned application of simpler and less costly construction, in which the possibility of poor conduction owing to the resilience of the conductive paths have been substantially eliminated, and in which a substantial shortening of the conductive paths for excessive currents has been simultaneously accomplished.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
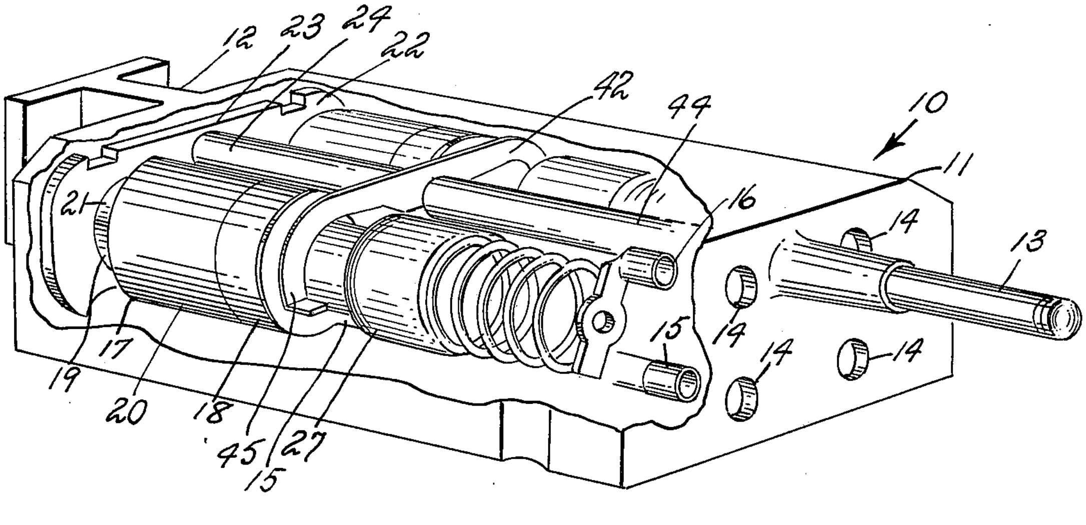
FIG. 1 is a view in perspective, somewhat schematic, of an embodiment of the invention.
Figure 2:
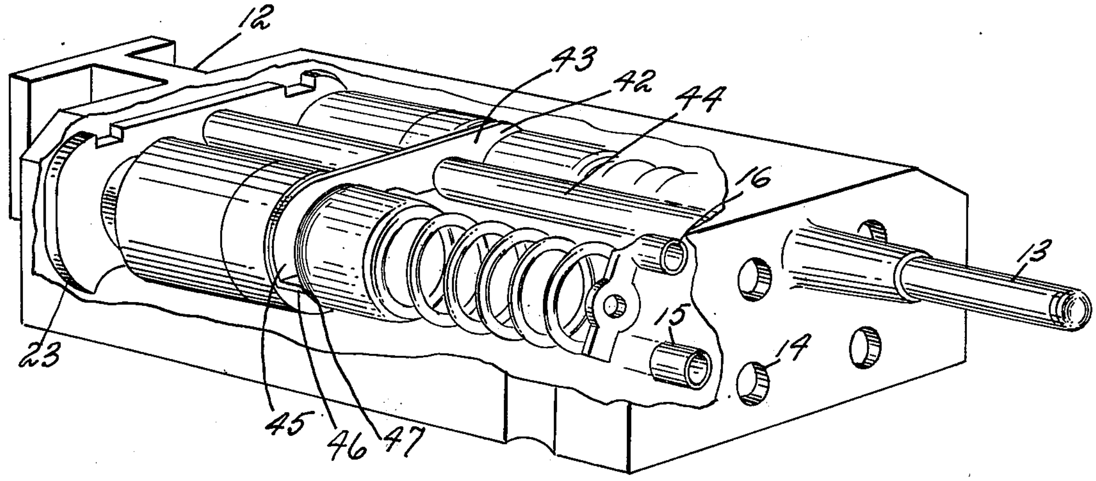
FIG. 2 is a similar perspective view showing certain of the component parts in altered relative position.

In accordance with the invention, the device, generally indicated by reference character 10, includes a housing element 11 having a removable end cover 12 selectively interconnectable therewith by means known in the art. The housing element 11 mounts a grounding prong 13 of conventional configuration, and a plurality of female contacts, normally four in number for interconnection with a known telephone circuit board. Connecting members 15 and 16 interconnect pairs of contacts 14 for electrical conduction during normal operation.

Excessive voltage protection means 17 includes a known type of carbon block gap device including a first carbon block 18 and a second carbon block 19 surrounded by a ceramic sleeve 20 which serves to form an air gap between the blocks. The outer end 21 of block 19 contacts a ground plane member 22, a center portion 23 of which is supported by a rear end 24 of the prong 13. In the absence of excessive voltage necessary to bridge the air gap, the gap device remains inoperative. Excessive voltage will cause the accompanying current to bridge the gap and be immediately conducted to ground without mechanical movement of the component parts.

The excess current protection means 27 includes a shaftlike pin or plunger 28, an end 29 of which penetrates a centrally disposed opening 30 in a circular plate 31 which forms part of the connecting member 15. It also penetrates a centrally disposed opening 32 in the carbon block 18. Surrounding the plunger 28 is a heat coil 33, again of known design, surrounded by a conductive member 34. An inner end 35 of the member 34 contacts one end 36 of a coil spring 37, the opposite 38 contacting the connecting member 16. Under normal operation, current passes between the connecting members 15 and 16 through the coil spring, the conductive member 34 and the plate 31.

Figure 3:
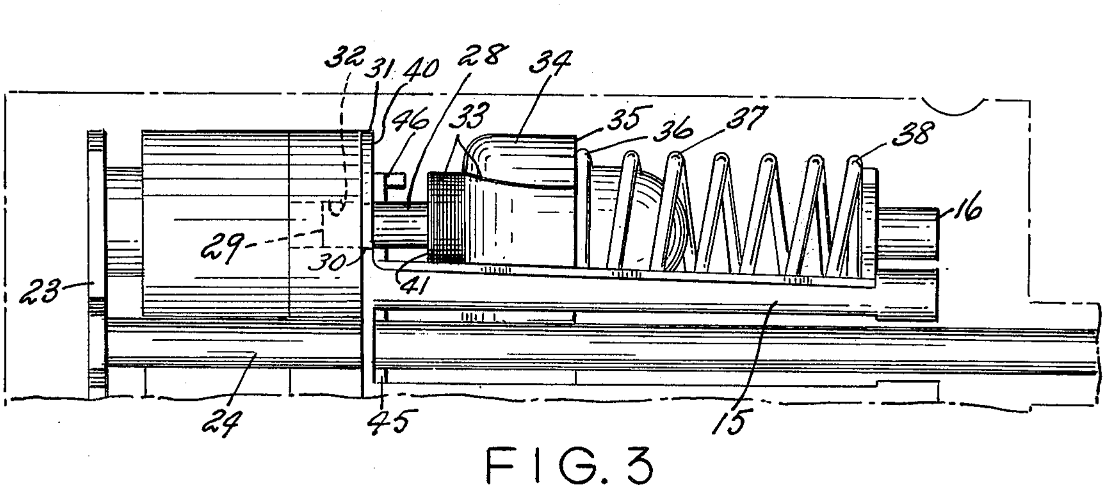
FIG. 3 is a bottom plan view of the embodiment.

Positioned between an inner surface 40 of the plate 31 and an end surface 41 of the conductive member 34 is a transversely-extending contact member 42, a central portion 43 of which is tack soldered to a medially disposed portion 44 of the prong 13. At each end 45 is a longitudinally extending terminal 46, the free end 47 of which clears the surface of the conductive member 34, as seen in FIGS. 1 and 3.

During normal operation, the solder fixing the position of the plunger 28 relative to the corresponding opening in the plate 31 maintains the component parts against the action of the coil spring 37 as shown in FIG. 1. Upon the melting of the solder, the spring expands and moves the conductive member 34 into contact with the terminal 46 for immediate conduction of excess current through the contact member 42 to the grounding prong 13. It will be observed that owing to its short length in a longitudinal direction, the terminal 46 is both relatively inflexible and incompressible, so that the relatively high modulus of the spring 37 assures continuous contact and a short path of current flow from the female contacts 14 to the grounding prong.

As known in the art, the structure is duplicated for each of two sets of connecting members 14 and 15, one circuit normally handling the so-called tip circuit, and the other the ring circuit.

Although not illustrated, it will be understood by those skilled in the art that the carbon block gap device may be substituted by a gaseous discharge device known in the art, and illustrated in my above mentioned copending application, in each case, the construction permitting the shorting of excessive currents directly to the grounding prong without passing through the high voltage arcing device.

Thus, as contrasted with prior art constructions, a reliable grounding path for excessive currents is provided, with an accompanying simplification of construction and manufacture. The disclosed construction may be readily incorporated in modules adapted to replace those currently in use without modification of known telephone circuit boards.

I wish it to be understood that I do not consider the invention limited to the precise details of structure shown and set forth in this specification, for obvious modifications will occur to those skilled in the art to which the invention pertains.

I claim:

1. In a telephone line protective module having means for conducting excessive voltage surges through an arcing device to a source of ground potential, and heat-sensitive means for conducting excessive currents to said source of ground potential, said last mentioned means serving to by-pass said arcing device upon activation of said heat-sensitive means, the improvement comprising: said module including a shaft-like plunger, coil spring means urging said plunger in a given direction, external contact means communicating with said plunger and spring for conducting current through said spring and plunger during normal operation; a grounding prong having a principal axis parallel to that of said plunger, a laterally extending grounding plate mounted substantially at one end of said grounding prong; said arcing means being axially aligned with said plunger and positioned to contact a surface of said grounding plate for electrical conduction therethrough, a laterally-extending conductor member mounted medially upon said grounding prong and extending between said arcing means and said plunger, said laterally-extending conductor member normally being free of contact with said plunger; whereby actuation of said heat-sensitive means serves to move said plunger toward said arcing means, and clamp said laterally-extending conductor member therebetween to cause conduction from said plunger to said grounding prong.

2. Structure in accordance with claim 1, further characterized in said laterally-extending conductor means including a longitudinally-extending terminal resisting the force of said coil spring when in conductive state.

* * * * *